(12) United States Patent
Suzuki

(10) Patent No.: US 6,178,938 B1
(45) Date of Patent: Jan. 30, 2001

(54) COMBUSTION HEATER FOR INTERNAL COMBUSTION ENGINE

(75) Inventor: Makoto Suzuki, Mishima (JP)

(73) Assignee: Toyota Jidosha Kabushiki Kaisha, Toyota (JP)

(*) Notice: Under 35 U.S.C. 154(b), the term of this patent shall be extended for 0 days.

(21) Appl. No.: 09/232,501

(22) Filed: Jan. 15, 1999

(30) Foreign Application Priority Data

Jan. 21, 1998 (JP) .................................................. 10-009886
Dec. 21, 1998 (JP) .................................................. 10-363005

(51) Int. Cl.$^7$ .................................................. F02N 17/02
(52) U.S. Cl. .......................................................... 123/142.5
(58) Field of Search .......................................... 123/142.5

(56) References Cited

U.S. PATENT DOCUMENTS

| | | |
|---|---|---|
| 2,290,300 | 7/1942 | Spackman . |
| 4,212,162 | 7/1980 | Kobayashi . |
| 4,556,171 * | 12/1985 | Fukami et al. ............ 123/142.5 |
| 4,836,445 | 6/1989 | Okada . |
| 4,858,825 | 8/1989 | Kawamura . |
| 4,927,077 | 5/1990 | Okada . |
| 5,528,901 * | 6/1996 | Willis ........................ 123/142.5 |
| 5,931,380 * | 8/1999 | Aoki et al. ................ 123/142.5 |
| 6,047,676 * | 4/2000 | Trapy ........................ 123/142.5 |
| 6,055,964 * | 5/2000 | Suzuki ...................... 123/142.5 |

FOREIGN PATENT DOCUMENTS

| | | |
|---|---|---|
| 4411959 | 10/1995 | (DE) . |
| 2381175 | 9/1978 | (FR) . |
| 2041081 | 9/1980 | (GB) . |
| 1595060 | 8/1981 | (GB) . |
| 60-244614A | 12/1985 | (JP) . |
| 62-75069A | 4/1987 | (JP) . |
| 62-99414U | 6/1987 | (JP) . |
| 63-75416U | 5/1988 | (JP) . |
| 63-75417U | 5/1988 | (JP) . |
| 918466 | 4/1980 | (RU) . |

* cited by examiner

Primary Examiner—John Kwon
(74) Attorney, Agent, or Firm—Kenyon & Kenyon

(57) ABSTRACT

The combustion heater when operates at a cold time increases a temperature of engine cooling water, and includes a combustion chamber in which the combustion takes place, an air supply passageway through which the air for the combustion is supplied to the combustion chamber, a heating plug for igniting a combustion fuel within the combustion chamber, and a combustion gas discharge passageway for discharging from the combustion chamber a combustion gas burned in the combustion chamber. Of the air supply passageway and the combustion gas discharge passageway, at least the combustion gas discharge passageway is connected to an intake passageway of the engine, through which the intake air flows toward the cylinders of the engine. The combustion heater has an air suction fan for regulating a quantity of air supplied to the combustion chamber via the air supply passageway, and an ECU which includes a CPU for controlling an operating state of the air suction fan according to an engine rotational speed.

11 Claims, 6 Drawing Sheets

COMBUSTION HEATER FOR INTERNAL COMBUSTION ENGINE

BACKGROUND OF THE INVENTION

1. Field of the Invention

The present invention relates generally to a combustion heater for an internal combustion engine and, more particularly, to a combustion heater for an internal combustion engine, which is disposed in an intake passageway of the internal combustion engine and raises temperature of engine related elements.

2. Description of the Prior Art

An internal combustion engine requires speeding up both a start and a warm-up thereof at a cold time. For example, Japanese Patent Application Laid-Open Publication No.62-75069 discloses an art of warming the engine cooling water by utilizing the combustion heat emitted from a vaporization type combustion heater attached to an intake passageway of the internal combustion engine, and thereby enhancing a heater performance of a car room heater as well as speeding up the warm-up of the engine.

According to this prior art, the combustion heater is operated before starting up the internal combustion engine, and the operation of the combustion heater continues for a short period of time after the engine start, thereby trying to enhance a starting characteristic of the internal combustion engine as well as speeding up the warm-up thereof.

In the prior art disclosed in the above Publication, a combustion chamber of the combustion heater includes an intake duct and an exhaust duct both of which are intake duct and an exhaust duct both of which are connected to an intake pipe of the internal combustion engine, and the air flowing through the intake pipe flows via a route of the intake pipe→the intake duct→the combustion chamber→the exhaust duct→the intake pipe, and at its halfway supplies the air as combustion air to the combustion heater. Further, an opening/closing valve defined as an intake air resisting structure is disposed at a portion of the intake pipe between respective connecting points for connecting the intake duct and the exhaust duct to the intake pipe.

As it is well known, in the internal combustion engine, a pressure and an air flow rate in the intake system change depending on a rotational speed of the engine body. Therefore, with the combustion heater disclosed in the above publication, the flow rate of the air supplied to the combustion chamber via the intake duct from the intake pipe becomes excessively large or small depending on the rotational speed of the internal combustion engine. Then, the problem of the prior art disclosed in the above Publication is that the air flow rate becomes excessively large due to the higher rotational speed of the internal combustion engine. The reason is that the excessively large air flow rate implies a state which is the same as a phenomenon of a strong air blown into the combustion chamber from the intake duct, and an air/fuel ratio becomes lean to deteriorate an ignition in the combustion heater.

On the other hand, in the case of providing the intake system with the combustion heater by setting the intake and exhaust ducts proximal to each other on the intake pipe without having the opening/closing valve disposed in the intake pipe, a differential pressure between the intake duct and the exhaust duct is small, and, even when the internal combustion engine is at a high rotational speed, the excessively large flow rate does not occur in the combustion chamber of the combustion heater. Consequently, the ignition characteristic of the combustion heater is not bad. However, when at the high rotational speed, the pressure in the intake system decreases. Hence, an air density decreases, and the air/fuel ratio in the combustion chamber becomes rich, with the result that soot is easily produced on the combustion heater. This might lead to a possibility of deteriorating the burning characteristic of the combustion heater.

SUMMARY OF THE INVENTION

It is a primary object of the present invention, which was devised under such circumstances, to provide a combustion heater for an internal combustion engine that is capable of reliably effecting an ignition in the combustion heater even during an operation of the internal combustion engine and improving a burning characteristic preferable.

To accomplish the above object, the combustion heater for the internal combustion engine of the present invention is constructed of the following structure.

According to a first aspect of the present invention, a combustion heater for an internal combustion engine, which operates when said internal combustion engine is in a predetermined operation state, thereby raising temperatures of engine related elements, said combustion heater comprising: a combustion chamber for executing a combustion; an air supply passageway for supplying said combustion chamber with air for the combustion; an igniting device for igniting a fuel for the combustion in said combustion chamber; and a combustion gas discharge passageway for discharging from said combustion chamber a combustion gas emitted when burned in said combustion chamber, and wherein at least one of said air supply passageway and said combustion gas discharge passageway is connected to an intake passageway of said internal combustion engine, and said combustion heater including: air supply quantity regulating means for regulating a quantity of air supplied to said combustion chamber via said air supply passageway; and control means for controlling an operating state of said air supply quantity regulating means in accordance with a rotational speed of said internal combustion engine.

Herein, the combustion chamber includes a combustion cylinder serving as a flame source from which flames are emitted, and a combustion fuel is supplied to the combustion cylinder via a proper fuel supply passageway.

The predetermined operating state of the internal combustion engine means that, at a cold time at which a temperature is in a range of from about −10° C. to about 15° C. and at an extremely cold time at which a temperature is about −10° C. or lower, the internal combustion engine is being operated, or after starting the internal combustion engine in the above-mentioned temperature, or, irrespective of the above-mentioned temperatures, an exothermic quantity of the internal combustion engine itself is small and a quantity of heat received by the cooling water is small due to the small exothermic quantity of the internal combustion engine itself.

According to a second aspect of the present invention, the combustion heater for the internal combustion engine according to the first aspect of the invention, wherein the air for the combustion may be introduced into the combustion chamber from the intake passageway via the air supply passageway or directly from the atmospheric air via the air supply passageway.

According to a third aspect of the present invention, the combustion heater for the internal combustion engine according to the second aspect of the invention, wherein the igniting device is preferably a heating plug.

The heating plug sparks in a state where the combustion cylinder is supplied with the combustion air and the combustion fuel, whereby the flames are emitted from the combustion cylinder.

According to a fourth aspect of the present invention, the combustion heater for the internal combustion engine according to the third aspect of the invention, wherein it is preferable that the combustion gas discharge passageway is an introducing passageway for introducing the combustion gas emitted from the combustion chamber into the intake passageway.

According to a fifth aspect of the present invention, the combustion heater for the internal combustion engine according to the fourth aspect of the invention, wherein the engine related elements are, for example, the engine cooling water and the internal combustion engine itself into which the combustion gas of the combustion heater is introduced as intake air.

According to a sixth aspect of the present invention, the combustion heater for the internal combustion engine according to the fifth aspect of the invention, wherein the control means may be a central processing unit (CPU) which is a central unit of a computer, namely, an engine control unit (ECU: an electronic control unit). However, as the CPU is included in the ECU, the ECU may be called control means.

According to a seventh aspect of the present invention, the combustion heater for the internal combustion engine according to the sixth aspect of the invention, wherein the air supply quantity regulating means may be an air suction fan.

According to an eighth aspect of the present invention, the combustion heater for the internal combustion engine according to the first aspect of the invention, wherein the combustion gas discharge passageway communicates with the intake passageway, and the air supply quantity regulating means reduces the air supply quantity by the control means when the engine rotational speed is high than when the engine rotational speed is low.

According to a ninth aspect of the present invention, the combustion heater for the internal combustion engine according to the first aspect of the invention, wherein the combustion heater may be connected in bypass to the intake passageway by the air supply passageway and the combustion gas discharge passageway, and the air supply quantity regulating means increases the air supply quantity by the control means when the engine rotational speed is high than when the engine rotational speed is low.

According to a tenth aspect of the present invention, the combustion heater for the internal combustion engine according to the eighth aspect of the invention, wherein the air suction fan is applied as the air supply quantity regulating means, and it is preferable that the air supply quantity is reduced by decreasing the rotational speed of the air suction fan by the control means.

According to an eleventh aspect of the present invention, the combustion heater for the internal combustion engine according to the ninth aspect of the invention, wherein the air suction fan is applied as the air supply quantity regulating means, and it is preferable that the air supply quantity is increased by increasing the rotational speed of the air suction fan by the control means.

In the combustion heater for the internal combustion engine according to the present invention, at least one of the air supply passageway and the combustion gas discharge passageway is connected to the intake passageway of the internal combustion engine, and the combustion heater comprises the air supply quantity regulating means for regulating the quantity of air supplied to the combustion chamber via the air supply passageway, and the control means for controlling the operating state of the air supply quantity regulating means in accordance with the rotational speed of the internal combustion engine, and, therefore, the operating state of the air supply quantity regulating means can be changed by the control means in accordance with the rotational speed of the engine. That is, the air supply quantity regulating means reduces the air supply quantity by the control means when the rotational speed is higher than when it is low. As a result, even when the rotational speed of the internal combustion engine is high, the quantity of air supplied to the combustion chamber via the air supply passageway is relatively small, and hence there is no strong air blow in the combustion chamber, when the igniting device performs the ignition in the combustion cylinders. Therefore, the igniting characteristic of the combustion heater cannot be declined.

The air supply quantity regulating means is the air suction fan and is, therefore, capable of regulating the air suction quantity by means of the rotations of the fan to any extent, and thus it is convenient as the air supply quantity regulating means.

Further, if only the combustion gas discharge passageway is communicated with the intake passageway, a relative pressure in the combustion gas discharge passageway to the air supply passageway becomes small if the rotational speed of the internal combustion engine increases. As a result, there appears the same phenomenon as the strong air is blown in the combustion chamber of the combustion heater. However, since the air supply quantity regulating means reduces the air supply quantity by the control means when the rotational speed is higher than when it is low, the excessive air does not enter the combustion chamber of the combustion heater. Therefore, even when only the combustion gas discharge passageway is communicated with the intake passageway, it does not cause the igniting characteristic of the combustion heater to decline.

In the case where the combustion heater is connected in bypass to the intake passageway of the internal combustion engine by the air supply passageway and the combustion gas discharge passageway, the air supply quantity regulating means increase the air supply quantity by the control means when the engine rotational speed is high than when it is low. Hence, the air in the intake passageway flows in the order of the intake passageway→the air supply passageway→the combustion chamber→the combustion gas discharge passageway→the intake passageway. At this time, if the rotational speed of the internal combustion engine is high, the air density in the intake passageway decreases, and consequently there might be a possibility that the air/fuel ratio in the combustion chamber of the combustion heater becomes rich, with the result that the soot is produced in the combustion chamber, thereby to lower the burning characteristic of the combustion heater. The control means, however, executes the control of increasing the air supply quantity, so that the air density increases enough to prevent the air/fuel ratio from becoming rich.

Specifically, if the combustion heater is connected in bypass to the intake passageway by the air supply passageway and the combustion gas discharge passageway, the air supply passageway and the combustion gas discharge passageway are not directly open to the atmospheric air, and, therefore, an effect of reducing noises can be expected.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Other objects and advantages of the present invention will become apparent by the following discussion in conjunction with the accompanying drawings, in which.

DESCRIPTION OF THE PREFERRED EMBODIMENTS

Embodiments of the present invention will hereinafter be described with reference to the accompanying drawings.

First Embodiment

A first embodiment will be described by referring to FIGS. 1 through 4.
(Entire Engine 1)

Figure 1:
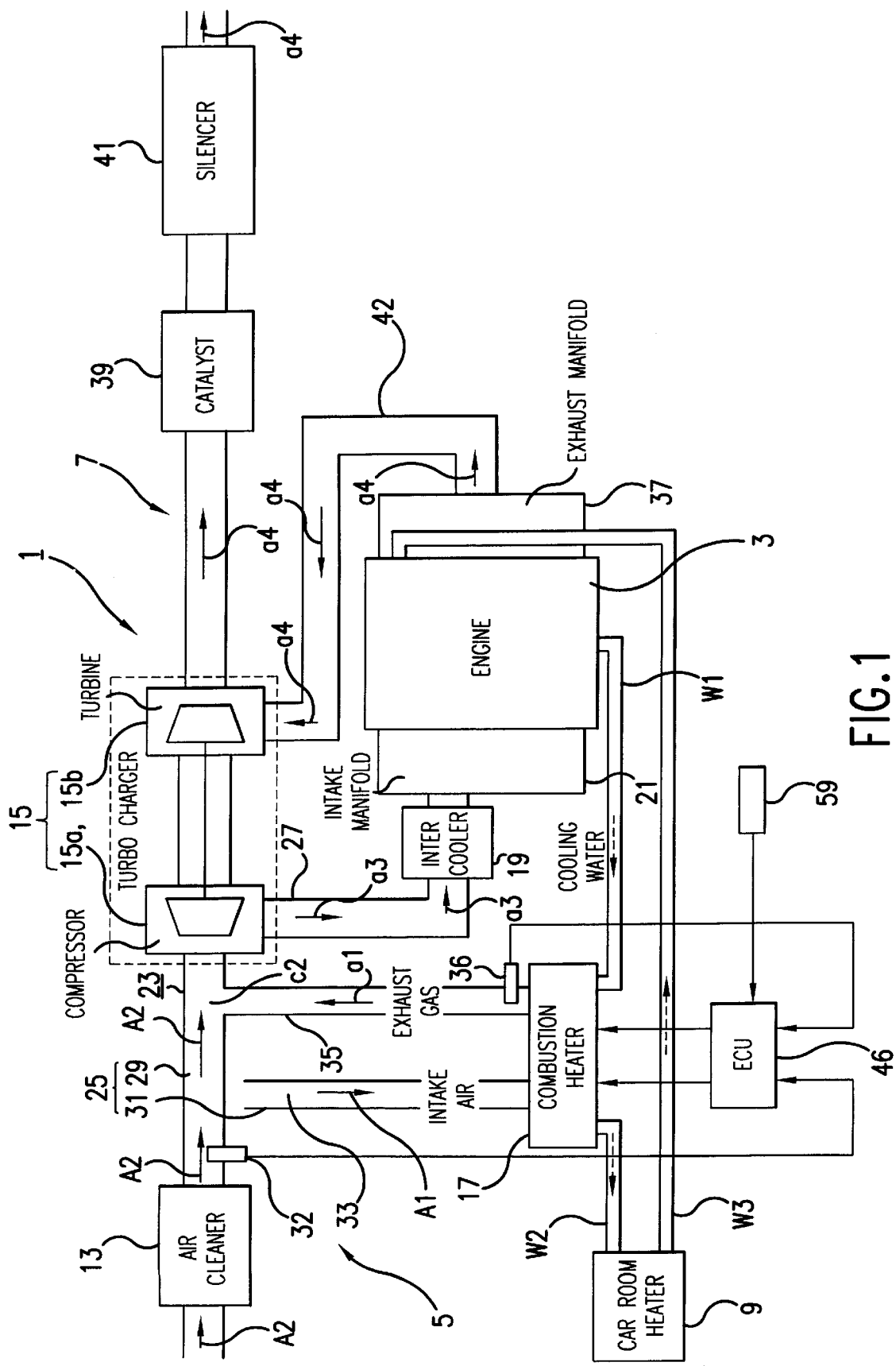
FIG. 1 is a schematic diagram showing an internal combustion engine to which a combustion heater for an internal combustion engine of a first embodiment of the present invention is applied.

To start with, FIG. 1 schematically shows an entire configuration of an internal combustion engine to which a combustion heater for an internal combustion engine according to the present invention is applied.

An engine 1 is a water cooling type internal combustion engine. The engine 1 comprises an engine body 3 disposed substantially at the center in FIG. 1 and including an unillustrated water jacket through which the engine cooling water is circulated; an air intake device 5 located at the upper left in FIG. 1, for supplying a plurality of unillustrated cylinders of the engine body 3 with the air needed for combustion; a exhaust device 7 located at the right side in FIG. 1, for discharging into the atmospheric air an exhaust gas produced after an air-fuel mixture has been burned in the cylinders; and a car room heater 9 located at the lower left end of the engine 1, for warming the interior of a room of a vehicle mounted with the engine 1.
(Air Intake Device 5)

The air intake device 5 structurally starts with an air cleaner 13 for taking the fresh air into the cylinders and terminates with an unillustrated intake port of the engine body 3, and it includes a compressor 15a of a turbo charger 15, a combustion heater 17, an inter cooler 19, and an intake manifold 21, all of which are located in the way from the air cleaner 13 to the unillustrated intake port, and each constituting a structure of an intake system.

These structures of the intake system are belonging to an intake pipe 23 serving as an intake passageway having a plurality of connecting pipes, to form the intake system.
(Intake Pipe 23)

The intake pipe 23 is, having the compressor 15a as a boundary, roughly divided into a downstream-side connecting pipe 27 which is brought into a pressurized state because of the outside air entering the air intake device 5 being forcibly intruded by the compressor 15a, and an upstream-side connecting pipe 25 which is not brought into the pressurized state.
(Upstream-side Connecting Pipe 25)

Referring to FIG. 1, the upstream-side connecting pipe 25 is constructed of a rod-like mainstream pipe 29 extending straight from the air cleaner 13 toward the compressor 15a, and a branch pipe 31 for the heater as a tributary pipe to the mainstream pipe 29.
(Mainstream Pipe 29)

An outside air temperature sensor 32 is attached to the mainstream pipe 29 at a portion in the vicinity of the downstream-side of the air cleaner 13. Outside air A2 entering the mainstream pipe 29 from the air cleaner 13 is the fresh air for the engine 1, and the outside air sensor 32 detects a temperature of the outside air A2.
<Branch Pipe 31 for Heater>

A branch pipe 31 for heater includes the combustion heater 17 disposed at the midway of this pipe 31. The branch pipe 31 has an air supply passageway 33 for supplying the combustion heater 17 with the fresh air, that is, the air A1 for combustion directly from the atmosphere and for connecting an upstream-side portion of the combustion heater 17 in an air flowing direction thereof to the atmospheric air, and a combustion gas discharge passageway 35, serving as an introducing passageway, for introducing a combustion gas (exhaust gas) emitted from the combustion heater 17 into the mainstream pipe 29 and for connecting a downstream-side portion of the combustion heater 17 in the air flowing direction thereof to the mainstream pipe 29. Note that the air related to the branch pipe 31 for the heater implies not only the outside air A1 but also a combustion gas a1 emitted from the combustion heater 17. The combustion gas from the combustion heater 17 is a gas emitting almost no smoke, in other words, containing no carbon. It is, therefore, no problem to use the combustion gas as the intake air of the internal combustion engine.
(Combustion Gas Temperature Sensor 36)

A combustion gas temperature sensor 36 is attached to the combustion gas discharge passageway 35 at a portion closer to the combustion heater 17. The combustion gas temperature sensor 36 detects a temperature of the combustion gas of the combustion heater 17 before it enters into the mainstream pipe 29 from the combustion heater 17.

The outside air A1 from the atmospheric air becomes a combustion gas mixed air a3 which is made by confluent of the air a1 with the outside air A2. The air a1 is an air which has become a combustion gas from the air A1 after burned in the combustion heater 17. The outside air A2 is an air which is flowing through the mainstream pipe 29 via the air cleaner 13.

Further, referring to FIG. 1, the downstream-side connecting pipe 27 is a pipe for connecting the compressor 15a to the intake manifold 21, and takes substantially an L-shape as far as the pipe 27 shown in FIG. 1. Moreover, the inter cooler 19 is disposed on the downstream-side connecting pipe 27 at a portion closer to the intake manifold 21.

(Exhaust Device 7)

On the other hand, the exhaust device 7 structurally starts with an unillustrated exhaust port of the engine body 3 and terminates with a silencer 41, and it includes an exhaust manifold 37, a turbine 15b of the turbo charger 15 and an exhaust gas catalyst 39 along an exhaust pipe 42, all of which are located in the way from the exhaust port down to the silencer 41. These components are well known and are not related directly to the present invention, and, therefore, the description thereof is omitted. The air flowing through the exhaust device 7 is designated by a reference symbol a4 as an exhaust gas of the engine 1.

(Combustion Heater 17)

Figure 2:
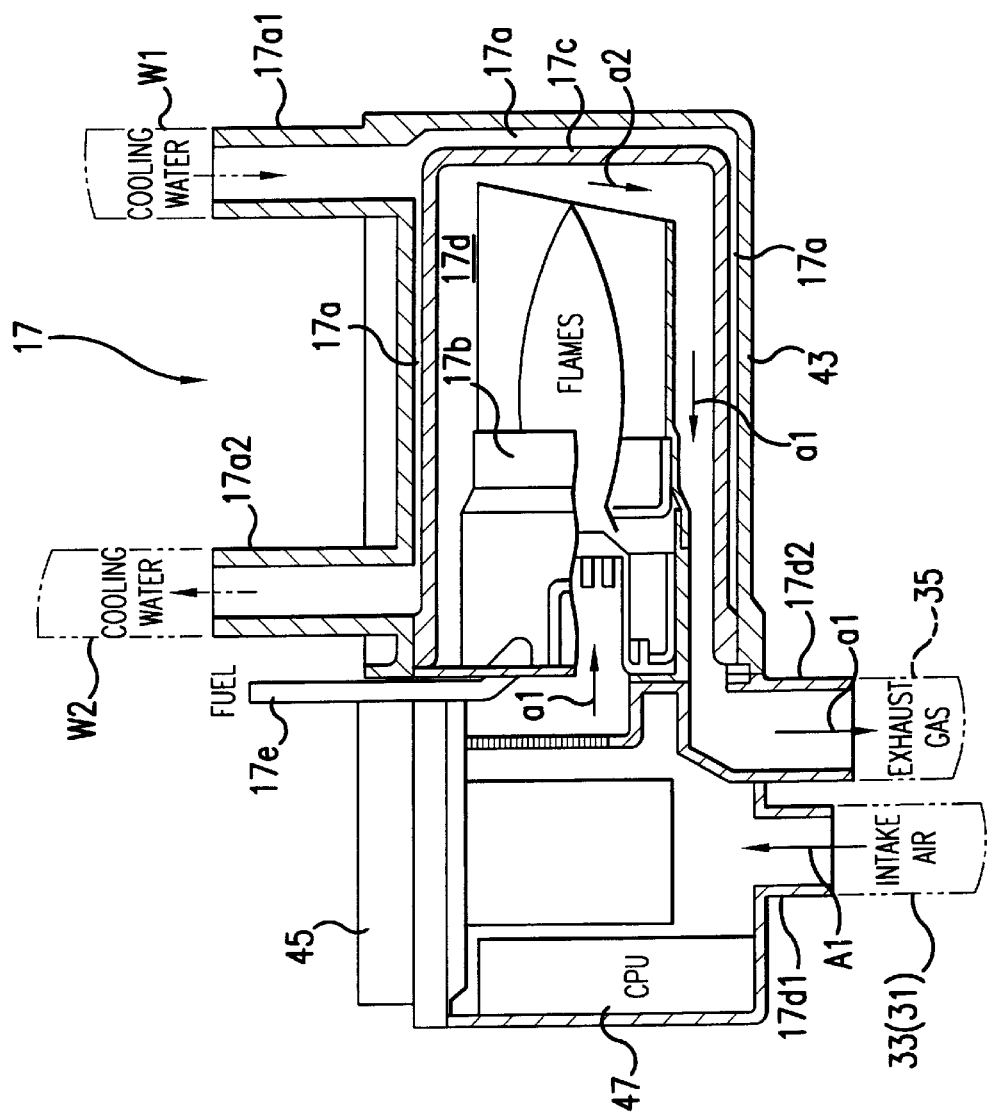
FIG. 2 is a sectional view schematically showing the combustion heater.

Next, a structure of the combustion heater 17 in the first embodiment is schematically shown in FIG. 2.

The combustion heater 17 operates when the engine 1 is in the predetermined operating state, namely, at a cold time or at an extremely cold time, the engine 1 is being operated, or after starting the engine 1 at temperatures of the above-mentioned cold time or the extremely cold time, and, irrespective of the above-mentioned cold time or the extremely cold time, when the exothermic quantity of emitted from the engine body 3 itself is small (for example, when a fuel consumption is small) and thereby the quantity of heat received by the cooling water is small. Here, "the cold time" falls within a temperature range from about −10° C. or higher to about 15° C. or lower, and "the extremely cold time" implies a temperature of about −10° C. or lower.

The combustion heater 17 is connected to the water jacket of the engine body 3 and includes a cooling water passageway 17a through which the cooling water flows from the water jacket. The cooling water (indicated by the broken line in FIG. 2) flowing through the cooling water passageway 17a passes through around a combustion chamber 17d, which is formed within the combustion heater 17 and where the combustion is made, during which the cooling water receives the heat from the combustion chamber 17d and is thus warmed up. This process will be sequentially described in greater detail.

<Combustion Chamber 17d>

The combustion chamber 17d is constructed of a combustion cylinder 17b serving as a flame source from which flames are emitted, and a cylindrical partition wall 17c for covering the combustion cylinder 17b to prevent the flames from leaking outside. The combustion cylinder 17b is covered with the partition wall 17c, whereby the combustion chamber 17d is defined inside by the partition wall 17c. Then, the partition wall 17c is also covered with an external wall 43 of the combustion heater 17, wherein a spacing is defined therebetween. With this spacing, the cooling water passageway 17a is formed between an inner surface of the external wall 43 and an outer surface of the partition wall 17c.

Further, the combustion chamber 17d has an air supply port 17d1 and an exhaust gas discharge port 17d2, which are respectively connected directly to the air supply passageway 33 and the combustion gas discharge passageway 35. The air A1 supplied from the air supply passageway 33, upon entering the combustion chamber 17d via the air supply port 17d1, flows therethrough and arrives at the exhaust gas discharge port 17d2. Thereafter, as described above, the air A1 flows via the combustion gas discharge passageway 35 into, as the air a1, the mainstream pipe 29. Hence, the combustion chamber 17d takes such a form of an air passageway as to communicate the air A1 into the combustion heater 17 and to change the air A1 into the air a1 by the combustion.

Then, the air a1 flowing back to the mainstream pipe 29 via the combustion gas discharge passageway 35 after being burned in the combustion heater 17, is, so to speak, an exhaust gas discharged from the combustion heater 17 and, therefore, holds the heat. Then, the air a1 holding the heat is discharged out of the combustion heater 17, during which the heat held by the air a1 is transmitted via the partition wall 17c to the cooling water flowing through the cooling water passageway 17a, thus warming the cooling water as described above. Accordingly, the combustion chamber 17d serves also as a heat exchange passageway.

<Combustion Cylinder 17b>

The combustion cylinder 17b includes a fuel supply pipe 17e connected to an unillustrated fuel pump, and a fuel for combustion is, upon receiving a pump pressure of the fuel pump, supplied therefrom to the combustion cylinder 17b. The combustion fuel supplied is vaporized within the combustion heater 17, thereby becoming a vaporized fuel. This vaporized fuel is ignited by an unillustrated igniting device such as a heating plug and the like.

Note that the air supply passageway 33 and the combustion gas discharge passageway 35 are used for only the combustion heater 17 and, therefore, they may be regarded as members of the combustion heater 17.

<Circulation of Cooling Water>

Next, a circulation of the cooling water through the cooling water passageway 17a will be described.

The cooling water passageway 17a has a cooling water intake port 17a1 connected to the water jacket of the engine body 3, and a cooling water discharge port 17a2 connected to the car room heater 9.

A water conduit W1 is interposed between the cooling water intake port 17a1 and the engine body 3, and a water conduit W2 is interposed between the cooling water discharge port 17a2 and the car room heater 9.

The combustion heater 17 is connected via these water conduits W1, W2 to the water jacket of the engine body 3 and to the car room heater 9 as well. Further, the car room heater 9 is likewise connected via a water conduit W3 to the engine body 3.

Accordingly, the cooling water of the water jacket of the engine body 3 flows in a sequence, as follows. (1) Arrives at the combustion heater 17 via the water conduit W1 from the cooling water intake port 17a1, and is warmed up there; (2) the warmed up cooling water flows from the cooling water discharge port 17a2 of the combustion heater 17 and arrives at the car room heater 9 through the water conduit W2; and (3) the cooling water, after having its temperature decreased by the heat exchange in the car room heater 9, flows back to the water jacket via the water conduit W3.

Thus, the cooling water is circulated between the engine body 3, the combustion heater 17 and the car room heater 9 via the water conduits W1, W2, W3.

Further, other than those described above, an air suction fan 45 and a central processing unit (CPU) 47, separated from an engine electronic control means (ECU) 46, for controlling the combustion heater 17 are provided within the external wall 43a of the combustion heater 17.

(ECU 46)

The ECU 46 is electrically connected to the outside air temperature sensor 32, the combustion gas temperature sensor 36, a rotational speed sensor 59, the air suction fan 45 for sucking the air A1 from the air supply passageway 33, and the unillustrated fuel pump. Then, parameters provided by the respective sensors 32, 36 and 59 are temporarily written to a random access memory RAM of the ECU 46, and fetched by the CPU 47 as the necessity rises. The CPU 47 of the combustion heater 17 operates according to each of the parameters stored in the RAM, thereby controlling a combustion state of the combustion heater 17. In other words, a force, a magnitude and a temperature of the flames in the combustion heater 17 and the rotational speed of the air suction fan 45, are controlled by the CPU 47, and, under this control, the temperature of the exhaust gas (the combustion gas) of the combustion heater 17 is controlled.

(Map M1)

Figure 3:
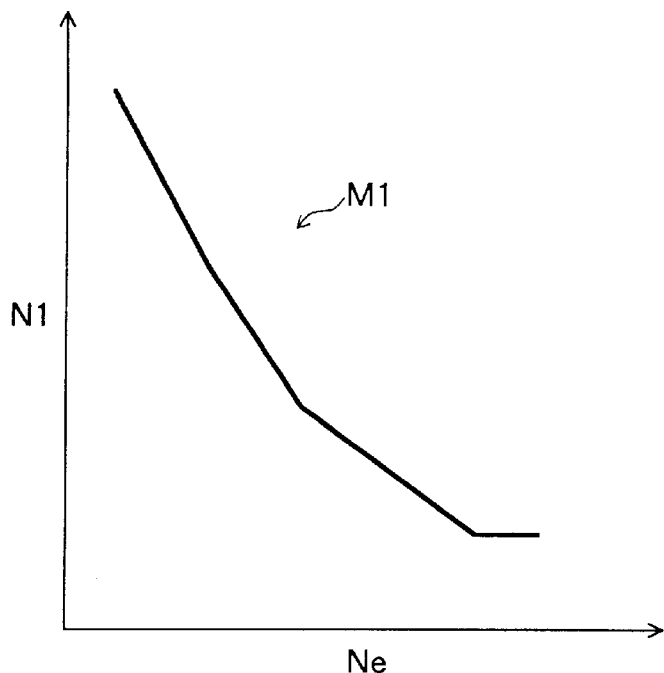
FIG. 3 is a rotational speed of engine versus a rotational speed of air suction fan graphic chart in the first embodiment.

Further, an unillustrated read-only memory ROM of the ECU 46 stored a map M1 as shown in FIG. 3. The map M1 is a graphic chart showing an engine rotational speed versus rotational speed of the air suction fan, in which the horizontal axis indicates the engine rotational speed Ne, and the vertical axis indicates the rotational speed N1 of the air suction fan 45. If the engine rotational speed Ne is known from the map M1, the rotational speed N1 of the air suction fan 45 is determined corresponding thereto. What is meant by the map M1 is that as the engine rotational speed Ne increases, the rotational speed N1 of the air suction fan 45 decreases. Accordingly, when the engine rotational speed Ne is high, the CPU 47 (ECU 46) controls the air suction fan 45 to make the rotational speed N1 thereof smaller than when the engine rotational speed Ne is low, thereby the quantity of air supplied to the combustion chamber 17d is reduced. Conversely, when the engine rotational speed Ne is low, the CPU 47 controls the air suction fan 45 to make the rotational speed N1 thereof larger than when the engine rotational speed Ne is high, thereby the quantity of air supplied to the combustion chamber 17d is increased.

(Operation Control Routine of Air Suction Fan 45)

Figure 4:
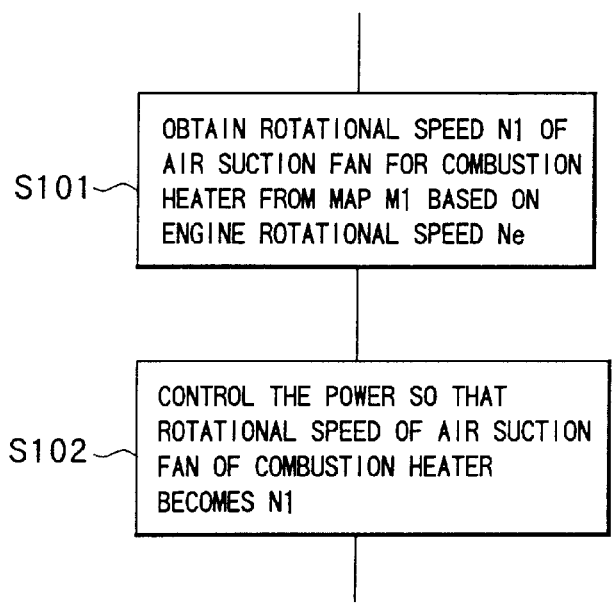
FIG. 4 is an operation control routine of an air suction fan in the first embodiment.

Next, a method of obtaining the actual rotational speed N1 of the air suction fan 45 will be described by referring to an operation control routine shown in FIG. 4.

This routine is a part of a normal routine (not shown) for driving the engine 1, and consists of steps 101 and 102 which will hereinafter be described. Further, all the operations in the following procedures are executed by the ECU 46 which includes the CPU 47. Note that the reference symbol "S" designates the step, and, for instance, step 101 is expressed by S101 in an abbreviated form. The rest is in the same manner.

When the process shifts to this routine after the engine 1 has been started, in S101 the rotational speed N1 of the air suction fan 45 to be controlled is obtained from the map M1 on the basis of the engine rotational speed Ne. Note that the rotational speed N1 obtained from the map M1 is temporarily stored in the random access memory RAM of the ECU 46, and is fetched by the CPU 47 properly as the necessity arises.

Next in S102, if an electric power for driving the air suction fan 45 is controlled so that the actual rotational speed of the air suction fan 45 becomes the rotational speed N1 obtained from the map M1, an actual rotational speed of the air suction fan 45 according to the engine rotational speed Ne can be determined.

As described above, when the actual rotational speed N1 of the air suction fan 45 is determined from the map M1, the quantity of air, which has been adjusted by the air suction fan 45, is supplied to the combustion chamber 17d from the air supply passageway 33. Thus, the air suction fan 45 can be called air supply quantity regulating means.

Also, the CPU 47, and, hence, the ECU 46 which includes the CPU 47, may be referred to as control means for controlling the operating state of the air suction fan 45 according to the engine rotational speed Ne.

(Operation and Effect of the First Embodiment)

Next, an operation and an effect of the first embodiment are described.

The combustion heater 17 for the internal combustion engine is arranged to embrace the air supply passageway 33 and the combustion gas discharge passageway 35 of which at least the combustion gas discharge passageway 35 is connected to the intake pipe 23. And the combustion heater 17 includes the air suction fan 45 for regulating the quantity of air supplied to the combustion chamber 17d via the air supply passageway 33, and the CPU 47 for controlling the operating state of the air suction fan 45 in accordance with the engine rotational speed Ne of the engine 1. Therefore, the operating state of the air suction fan 45 can be changed (i.e. controlled) by the ECU 46 (CPU 47) in accordance with the engine rotational speed Ne. Namely, the air suction fan 45 reduces the air quantity supplied via the air supply passageway 33 by the ECU 46 (CPU 47) when the engine rotational speed Ne is higher than when the value Ne is lower. As a result, even when the engine rotational speed Ne is high, a less quantity of air is supplied to the combustion chamber 17d via the air supply passageway 33, and, consequently, ignition of the combustion cylinder 17b by the igniting device can be made in a state of little or no air blow. Thus, the igniting characteristic of the combustion heater 17 does not decline.

Further, the air suction fan 45 is capable of regulating its air suction quantity by controlling the rotations of the fan itself to any extent, and is, therefore, convenient and preferable as air supply quantity regulating means.

Moreover, when only the combustion gas discharge passageway 35 communicates with the intake pipe 23, a pressure in the combustion gas discharge passageway 35 with respect to the air supply passageway 33 becomes relatively small when the engine rotational speed Ne increases. As a result, there appears the same phenomenon as a strong air blow in the combustion chamber 17d of the combustion heater 17. The air suction fan 45 reduces the air supply quantity under the control by the ECU 46 when the engine rotational speed Ne is high than when the value Ne is low, with the result that the excessive air does not enter the combustion chamber 17d of the combustion heater 17. Hence, even if only the combustion gas discharge passageway 35 is communicated with the intake pipe 23, the igniting characteristic of the combustion heater 17 does not decline.

<Second Embodiment>

A second embodiment will be described with reference to FIGS. 5 and 6.

Figure 5:
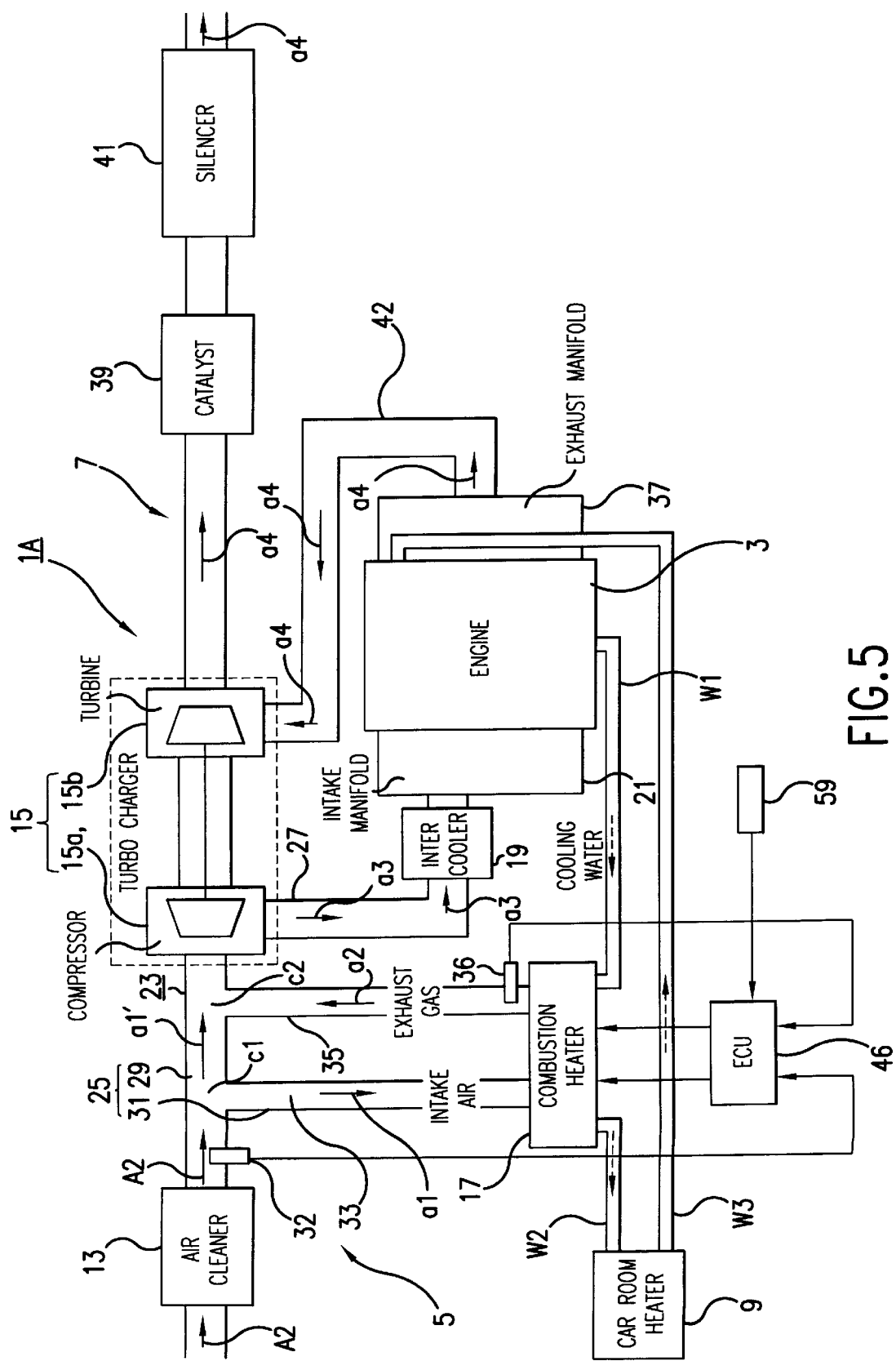
FIG. 5 is a schematic diagram showing the internal combustion engine to which the combustion heater for the internal combustion engine of a second embodiment of the present invention is applied.
Figure 6:
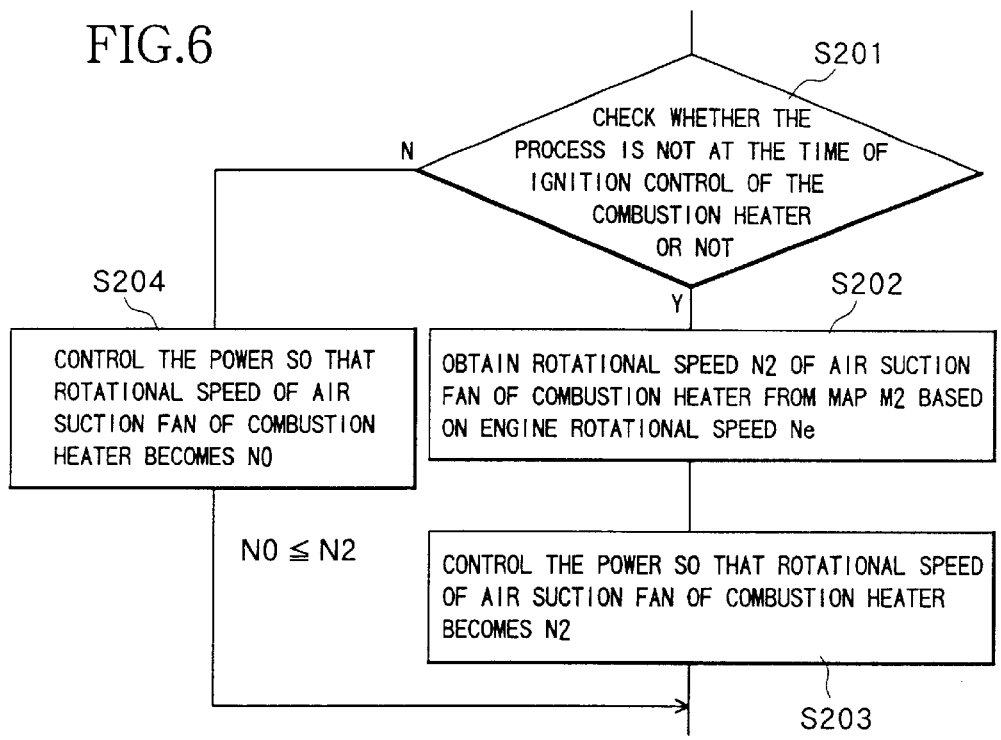
FIG. 6 is an operation control routine of the air suction fan in the second embodiment.

FIG. 5 illustrates an overall configuration of an engine 1A of the second embodiment.

(Difference between Engine 1A and Engine 1)

Only differences of the engine 1A from the engine 1 of the first embodiment are that the air supply passageway 33 is connected to the mainstream pipe 29, that the spacing between the connecting point c1 for connecting the air supply passageway 33 to the mainstream pipe 29 and the connecting point c2 for connecting the combustion gas discharge passageway 35 to the mainstream pipe 29 is narrowed, thereby to reduce a differential pressure between the air supply passageway 33 and the combustion gas discharge passageway 35, and that the map M for obtaining the rotational speed of the air suction fan 45 is designated by M2, instead of M1. Therefore, for the same components, the description is omitted, and like symbols and numbers are used.

The air supply passageway 33 is connected to the mainstream pipe 29, whereby a branch pipe 31A for the heater is formed as a tributary pipe connected in bypass to the mainstream pipe 29. Then, the way of supplying the combustion heater 17 with the air differs because of the branch pipe 31A for the heater.

Air A2 from the air cleaner 13 is, to begin with, separated into air a1 diverging at the connecting point c1 toward the branch pipe 31A, and air a1' flowing along the mainstream pipe 29 toward the connecting point c2 without diverging. At the connecting point c2, the air a2 which has been diverged at the connecting point c1 and turned out to be the combustion gas when burned in the combustion heater 17, becomes confluent with the fresh air a1' not diverging at the connecting point c1, thereby becoming the combustion gas mixed air a3.

The air a1 diverged at the connecting point c1 flows via a route of the air supply passageway 33→the combustion heater 17→the combustion gas discharge passageway 35, and flows back as the air a2 to the mainstream pipe 29 from the connecting point c2. The air a2 returning to the mainstream pipe 29 is the combustion gas which holds the heat when burned in the combustion heater 17, and this gas a2 confluent at the connecting point c2 with the air a1' which has not been diverged, thereby becomes the combustion gas mixed air a3. Then, this combustion gas mixed air a3 becomes the intake air entering the engine body 3.

(Map M2)

The map M2, similar to the map M1, is a graphic chart showing the engine rotational speed versus the rotational speed of the suction fan, and being stored in the read-only memory ROM. Note that a predetermined rotational speed on the horizontal is a limit value of the engine rotational speed Ne indicating that, if the engine operates at a greater rotational speed than this predetermined rotational speed, the air/fuel ratio becomes rich and soot is produced.

What is meant by the map M2 is that as the engine rotational speed Ne increases from the predetermined rotational speed, the rotational speed N2 of the air suction fan 45 increases. Accordingly, when the engine rotational speed Ne is high, the CPU 47 (ECU 46) controls the air suction fan 45 to increase the rotational speed N2 thereof than when the engine rotational speed Ne is low, thereby the quantity of air supplied to the combustion chamber 17d is increased. Conversely, when the engine rotational speed Ne is low, the CPU 47 controls the air suction fan 45 to lower the rotational speed N2 thereof than when the engine rotational speed Ne is high, thereby the quantity of air supplied to the combustion chamber 17d is reduced.

The rotational speed of the air suction fan 45, which is determined according to the engine rotational speed, is temporarily stored in the RAM and properly fetched by the CPU 47 as the necessity arises.

(Operation Control Routine of Air Suction Fan 45)

Next, a method of obtaining the actual rotational speed N2 of the air suction fan 45 will be described by referring to an operation control routine shown in FIG. 6.

This routine is a part of a normal routine (not shown) for driving the engine 1A, and consists of steps 201 and 204 which will hereinafter be described. Further, all the operations in the following procedures are executed by the ECU 46.

When the process shifts to this routine after the engine 1A has been started, it is judged in S201 whether the process is not at the time of ignition control of the combustion heater 17 or not. Here, the time of ignition control of the combustion heater 17 means the time of starting the ignition and a period from after ignition and until the combustion is stabilized.

If judged to be affirmative, namely, not at the time of ignition control, in S201, the process advances to next S202 and, whereas if negative, namely, at the time of ignition control, the process advances to S204. In S204, the electric power is so controlled that the rotational speed of the air suction fan 45 becomes a rotational speed N0 which is not to hinder the ignition, thereupon this routine comes to an end.

Figure 7:
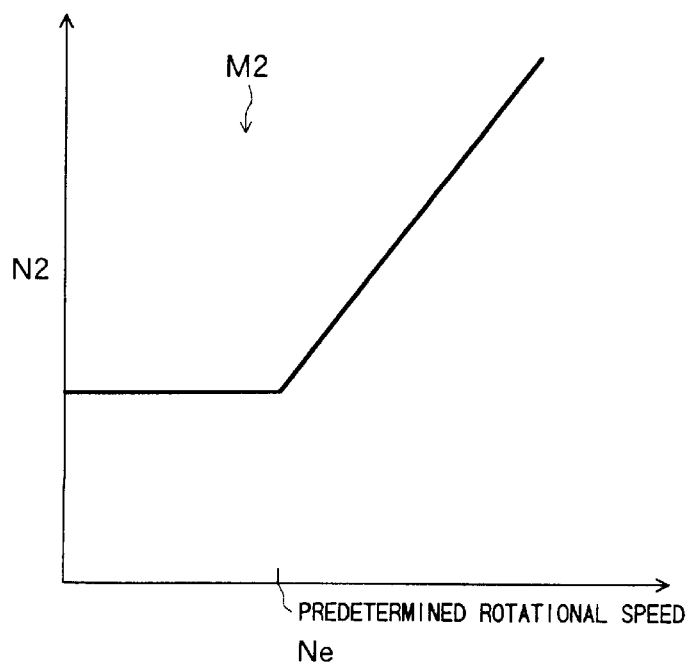
FIG. 7 is a rotational speed of engine versus a rotational speed of air suction fan graphic chart in the second embodiment.

In S202, a rotational speed N2 of the air suction fan 45 is obtained from the map M2 shown in FIG. 7 on the basis of the engine rotational speed Ne.

If the electric power for driving the air suction fan 45 is controlled in the next S203 so that the actual rotational speed of the air suction fan 45 becomes the rotational speed N2 obtained based on the map M2, the actual rotational speed N2 of the air suction fan 45 according to the engine rotational speed Ne can be obtained. Note that values N0 and N2 have a relationship of $N0 \leq N2$.

<Operation and Effect of the Second Embodiment>

The combustion heater 17 in the second embodiment is connected in bypass to the intake pipe 23 through the air supply passageway 33 and the combustion gas discharge passageway 35, and the air suction fan 45 increases the air supply quantity by the CPU 47 (ECU 46) when the engine rotational speed Ne is higher than when it is low. Hence, the air in the intake pipe 23 flows in the sequence of the intake pipe 23 (precisely the mainstream pipe 29 of the intake pipe 23) the air supply passageway 33→the combustion chamber 17d→the combustion gas discharge passageway 35→the intake pipe 23 (precisely the mainstream pipe 29 of the intake pipe 23). At this time, if the engine rotational speed Ne is high, an air density in the intake pipe 23 decreases, and there might be a possibility for an air/fuel ratio in the combustion chamber 17d of the combustion heater 17 becomes rich with the result that the combustion characteristic is considered to be declined. However, the CPU 47 (ECU 46) executes the control of increasing the air supply quantity, and, therefore, the air density increases enough to prevent the air/fuel ratio from becoming rich. Consequently, no soot is produced from the combustion heater 17.

Further, since the air supply passageway 33 and the combustion gas discharge passageway 35 are not open directly to the atmospheric air, an effect of reducing the noises can be expected.

<Third Embodiment>

Figure 8:
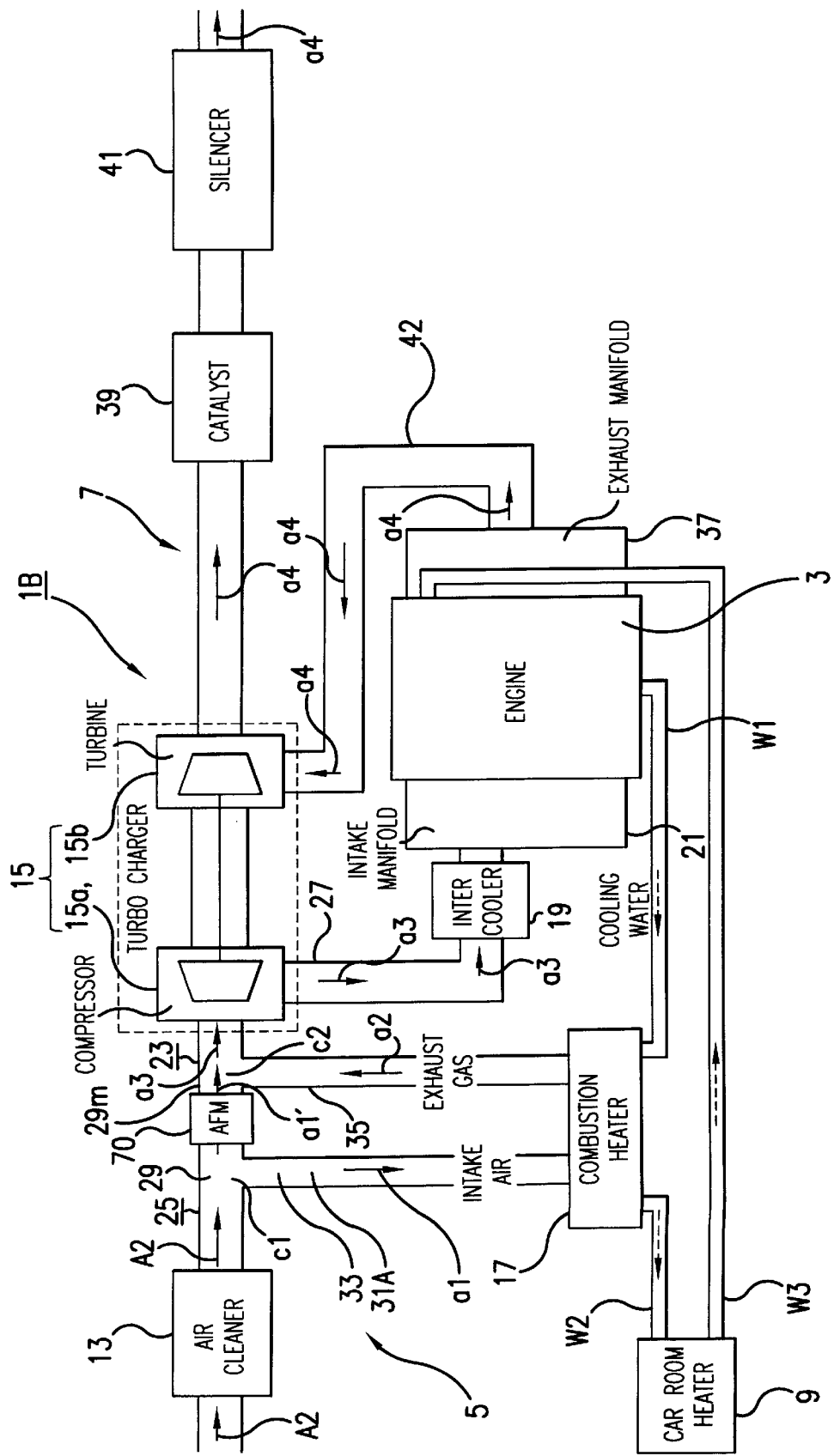
FIG. 8 is a schematic diagram showing the internal combustion engine to which the combustion heater for the internal combustion engine of a third embodiment of the present invention is applied.

A third embodiment will be described with reference to FIG. 8.

An engine of the third embodiment is designated by the reference symbol 1B.

(Difference between Engine 1B and Engine 1A)

A difference of the engine 1B from the engine 1A of the second embodiment, is that an airflow meter 70, which is an intake air resisting structure, is disposed at a portion of the mainstream pipe 29 between the connecting point c1 for connecting the air supply passageway 33 to the mainstream pipe 29 and the connecting point c2 for connecting the combustion gas discharge passageway 35 to the mainstream pipe 29, in other words, at the portion of the mainstream pipe 29 which is located more upstream than the connecting point c2 where the combustion gas discharge passageway 35 is connected to the mainstream pipe 29. Therefore, for the same components as those of the engine 1A, description thereof is omitted, and like symbols and numbers are used.

Generally, the airflow meter is the air resisting structure for hindering the flow of air flowing through the intake passageway, and, therefore, a pressure of the air flowing out of the airflow meter is smaller than a pressure of the air entering the airflow meter. Namely, the airflow meter has a large difference between the air pressure at the inlet side and the air pressure at the outlet side. Hence, in the third embodiment, there increases the differential pressure between the connecting points c1 and c2 where the air supply passageway 33 and the combustion gas discharge passageway 35 are respectively connected to the mainstream pipe 29.

Thus, when the airflow meter as the intake air resisting structure having the difference in the air pressure between its inlet side and outlet side, is disposed at a portion 29 m between the connecting point c1 where the air supply passageway 33 is connected to the mainstream pipe 29 and the connecting point c2 where the combustion gas discharge passageway 35 is connected to the mainstream pipe 29, there is a large differential pressure between the connecting points c1 and c2, namely, between the inlet of the air supply passageway 33 and the outlet of the combustion gas discharge passageway 35. Hence, there might be a possibility that the igniting characteristic of the combustion heater 17 declines due to an excessive air flow velocity in the combustion chamber 17d of the combustion heater 17 which is located between the air supply passageway 33 and the combustion gas discharge passageway 35.

<Operation and Effect of the Third Embodiment>

However, even in the combustion heater for the internal combustion engine which is related to the engine 1B of the third embodiment, as in the case of the combustion heater for the internal combustion engine of the first embodiment (not of the second embodiment), the CPU 47 (ECU 46) changes the operating state of the air suction fan 45 according to the engine rotational speed Ne. To be specific, the air suction fan 45 reduces the quantity of air supplied via the air supply passageway under the control by the CPU 47 (ECU 46) when the engine rotational speed Ne is high than when it is low. As a result, even when the engine rotational speed Ne is higher, the quantity of air supplied to the combustion chamber 17d via the air supply passageway 33 is reduced, and, therefore, the air flow velocity in the combustion chamber 17d does not become excessive, and when ignited in →the combustion cylinders 17b by the igniting device, it is made in the state of little or no air blow, thereby the igniting characteristic of the combustion heater 17 does not decline.

As described above, the combustion heater for the internal combustion engine according to the present invention operates in the predetermined operating state of the internal combustion engine and raises the temperatures of the engine related elements, and includes the combustion chamber, the air supply passageway, the fuel supply passageway, the igniting device and the combustion gas discharge passageway. Then, of the air supply passageway and the combustion gas discharge passageway, at least the combustion gas discharge passageway is connected to the intake passageway through which the intake air flows toward the cylinders of the internal combustion engine. The combustion heater has the air supply quantity regulating means for regulating the quantity of the air supplied to the combustion chamber via the air supply passageway, and the control means for controlling the operating state of the air supply quantity regulating means in accordance with the rotational speed of the internal combustion engine. Thus, even during the operation of the internal combustion engine, the ignition of the combustion heater can be reliably effected, and the burning characteristic of the combustion heater can be improved.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A combustion heater for an internal combustion engine, which operates when said internal combustion engine is in a predetermined operation state, thereby raising temperatures of engine related elements, said combustion heater comprising:
 a combustion chamber for executing a combustion;
 an air supply passageway for supplying said combustion chamber with air for the combustion;
 an igniting device for igniting a fuel for the combustion in said combustion chamber; and
 a combustion gas discharge passageway for discharging from said combustion chamber a combustion gas emitted when burned in said combustion chamber, and wherein
 at least one of said air supply passageway and said combustion gas discharge passageway is connected to an intake passageway of said internal combustion engine, and
 said combustion heater including:
  air supply quantity regulating means for regulating a quantity of air supplied to said combustion chamber via said air supply passageway; and
  control means for controlling an operating state of said air supply quantity regulating means in accordance with a rotational speed of said internal combustion engine.

2. A combustion heater for an internal combustion engine according to claim 1, wherein the air for the combustion is introduced into said combustion chamber from said intake passageway via said air supply passageway or directly from the atmospheric air via said air supply passageway.

3. A combustion heater for an internal combustion engine according to claim 2, wherein said igniting device is a heating plug.

4. A combustion heater for an internal combustion engine according to claim 3, wherein said combustion gas discharge passageway is an introducing passageway for introducing the combustion gas emitted from said combustion chamber into said intake passageway.

5. A combustion heater for an internal combustion engine according to claim 4, wherein said engine related elements are the engine cooling water and said internal combustion engine itself into which the combustion gas of said combustion heater is introduced as intake air.

6. A combustion heater for an internal combustion engine according to claim 5, wherein said control means is a central processing unit which is a central portion of said engine control means.

7. A combustion heater for an internal combustion engine according to claim 6, wherein said air supply quantity regulating means is an air suction fan.

8. A combustion heater for an internal combustion engine according to claim 1, wherein said combustion gas discharge passageway communicates with said intake passageway, and
 said air supply quantity regulating means reduces the air supply quantity by said control means when the engine rotational speed is high than when the engine rotational speed is low.

9. A combustion heater for an internal combustion engine according to claim 1, wherein said combustion heater is connected in bypass to said intake passageway by said air supply passageway and said combustion gas discharge passageway, and said air supply quantity regulating means increases the air supply quantity by said control means when the engine rotational speed is high than when the engine rotational speed is low.

10. A combustion heater for an internal combustion engine according to claim 8, wherein said air suction fan is applied as the air supply quantity regulating means; and wherein the air supply quantity is reduced by decreasing the rotational speed of said air suction fan by said control means.

11. A combustion heater for an internal combustion engine according to claim 9, wherein said air suction fan is applied as the air supply quantity regulating means; and wherein the air supply quantity is increased by increasing the rotational speed of said air suction fan by said control means.

\* \* \* \* \*